(12) United States Patent
Bendert et al.

(10) Patent No.: US 12,423,073 B2
(45) Date of Patent: Sep. 23, 2025

(54) SOFTWARE COMPONENT DEPENDENCY TRACKER

(71) Applicant: Wells Fargo Bank, N.A., San Francisco, CA (US)

(72) Inventors: David P. Bendert, Charlotte, NC (US); Jason Franklin Frye, Monroe, NC (US); Maximilian Fuchs, Charlotte, NC (US); Jennifer Marie Giannoulis, Waxhaw, NC (US); Magesh Punniyamoorthy, Charlotte, NC (US); Matthew O. Spain, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 20 days.

(21) Appl. No.: 18/295,554

(22) Filed: Apr. 4, 2023

(65) Prior Publication Data

US 2024/0338184 A1 Oct. 10, 2024

(51) Int. Cl.
*G06F 8/41* (2018.01)
(52) U.S. Cl.
CPC .................................. *G06F 8/433* (2013.01)
(58) Field of Classification Search
None
See application file for complete search history.

(56) References Cited

U.S. PATENT DOCUMENTS

| | | | |
|---|---|---|---|
| 8,145,471 B2 | 3/2012 | Beyer et al. |
| 8,175,863 B1 | 5/2012 | Ostermeyer et al. |
| 8,244,853 B1 | 8/2012 | Raanan |
| 8,458,695 B2 | 6/2013 | Fitzgerald et al. |
| 8,725,871 B2 | 5/2014 | Ding et al. |
| 8,813,065 B2 | 8/2014 | Zygmuntowicz et al. |
| 8,856,748 B1 | 10/2014 | Larsen et al. |
| 9,009,677 B2 | 4/2015 | Zhao et al. |
| 9,104,794 B2 | 8/2015 | Zakonov et al. |
| 9,286,063 B2 | 3/2016 | Kriegsman et al. |
| 9,785,461 B2 | 10/2017 | Anerousis et al. |
| 10,083,029 B2 | 9/2018 | Odvody et al. |
| 10,216,485 B2 | 2/2019 | Misra et al. |
| 10,264,101 B2 | 4/2019 | Blank |
| 10,691,810 B1 | 6/2020 | Freitag et al. |
| 10,812,346 B1 | 10/2020 | Cross et al. |

(Continued)

OTHER PUBLICATIONS

"U.S. Appl. No. 18/295,549, Non Final Office Action mailed Dec. 19, 2024", 20 pgs.

(Continued)

*Primary Examiner* — Andrew M. Lyons
(74) *Attorney, Agent, or Firm* — SCHWEGMAN LUNDBERG & WOESSNER, P.A.

(57) ABSTRACT

Disclosed in some examples are methods, systems, devices, and machine-readable mediums for a dependency tracking service which automatically identifies and tracks information about dependencies of a software component and provides one or more visualizations displaying that information. The system may identify the dependencies through automated metadata analysis of the software component, behavior analysis of the software component, or source code analysis of the software component. The system may track status of the software component by reference to one or more code management systems, vulnerability reporting systems, or the like.

17 Claims, 6 Drawing Sheets

(56) References Cited

U.S. PATENT DOCUMENTS

| | | | |
|---|---|---|---|
| 10,862,779 | B2 | 12/2020 | Sahoo et al. |
| 10,911,408 | B2 | 2/2021 | Naik et al. |
| 10,924,410 | B1* | 2/2021 | Nee .................. H04L 67/566 |
| 10,965,736 | B2 | 3/2021 | Orman |
| 11,030,068 | B1* | 6/2021 | Agarwal ............ G06F 11/327 |
| 11,178,034 | B1 | 11/2021 | Joshi et al. |
| 11,343,355 | B1 | 5/2022 | Goela et al. |
| 11,354,131 | B2 | 6/2022 | Balasubramanian et al. |
| 11,409,507 | B1* | 8/2022 | Shepherd .............. G06F 8/75 |
| 11,438,278 | B2 | 9/2022 | Gnaneswaran et al. |
| 11,463,478 | B2 | 10/2022 | Nadgowda et al. |
| 11,714,629 | B2* | 8/2023 | Shaastry ......... G06F 16/24578 717/168 |
| 2005/0047556 | A1 | 3/2005 | Somerville et al. |
| 2010/0042582 | A1 | 2/2010 | Aggarwal et al. |
| 2011/0066719 | A1* | 3/2011 | Miryanov .......... G06F 11/3495 709/224 |
| 2013/0166504 | A1 | 6/2013 | Varkhedi et al. |
| 2015/0143355 | A1* | 5/2015 | Tingstrom ............. H04L 67/10 717/170 |
| 2016/0162317 | A1 | 6/2016 | Doherty et al. |
| 2018/0260301 | A1 | 9/2018 | Podjarny et al. |
| 2020/0202006 | A1* | 6/2020 | Shah ..................... G06F 8/77 |
| 2020/0257504 | A1* | 8/2020 | Kadam .................. G06F 8/36 |
| 2021/0026756 | A1 | 1/2021 | Magnezi et al. |
| 2021/0089286 | A1 | 3/2021 | Barkus et al. |
| 2022/0019522 | A1 | 1/2022 | Jaros et al. |
| 2022/0116292 | A1 | 4/2022 | Madani et al. |
| 2023/0266989 | A1 | 8/2023 | Van Welzen et al. |
| 2024/0160559 | A1 | 5/2024 | Mietke |
| 2024/0338310 | A1 | 10/2024 | Bendert et al. |

OTHER PUBLICATIONS

"U.S. Appl. No. 18/295,549, Response filed Mar. 5, 2025 to Non Final Office Action mailed Dec. 19, 2024", 11 pgs.

"U.S. Appl. No. 18/295,549, Examiner Interview Summary mailed Mar. 6, 2025", 2 pgs.

Bhowate, Pranali K., "A Review Of Runtime Software Testing Of A Systems Migrate To The Cloud With A Taas Environment", International Journal of Engineering Research and Technology vol. 2 Issue 2, (Feb. 2013), 7 pgs.

Wu, Yangyang, "Performance Modeling of Virtual Machine Live Migration", IEEE 4th International Conference on Cloud Computing, (Sep. 2011), 8 pgs.

"U.S. Appl. No. 18/295,549, Notice of Allowance mailed Apr. 30, 2025", 12 pgs.

* cited by examiner

SOFTWARE COMPONENT DEPENDENCY TRACKER

TECHNICAL FIELD

Embodiments pertain to software component development tools. Some embodiments relate to software component dependency tracking.

BACKGROUND

The performance of modern software components usually depends upon both other software components as well as available hardware resources on which it runs. Software dependencies may include standardized libraries, frameworks, toolkits, application programming interfaces (APIs), and the like. These dependencies may be components linked with the software component when the software code of the component is compiled or may be external software components that the software component communicates with or uses during run-time. Software dependencies may also extend to available hardware resources and operating environments. For example, the software component's performance may change based upon the hardware resources available to it. These hardware and software dependencies may in turn, have their own dependencies, which form a dependency chain.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
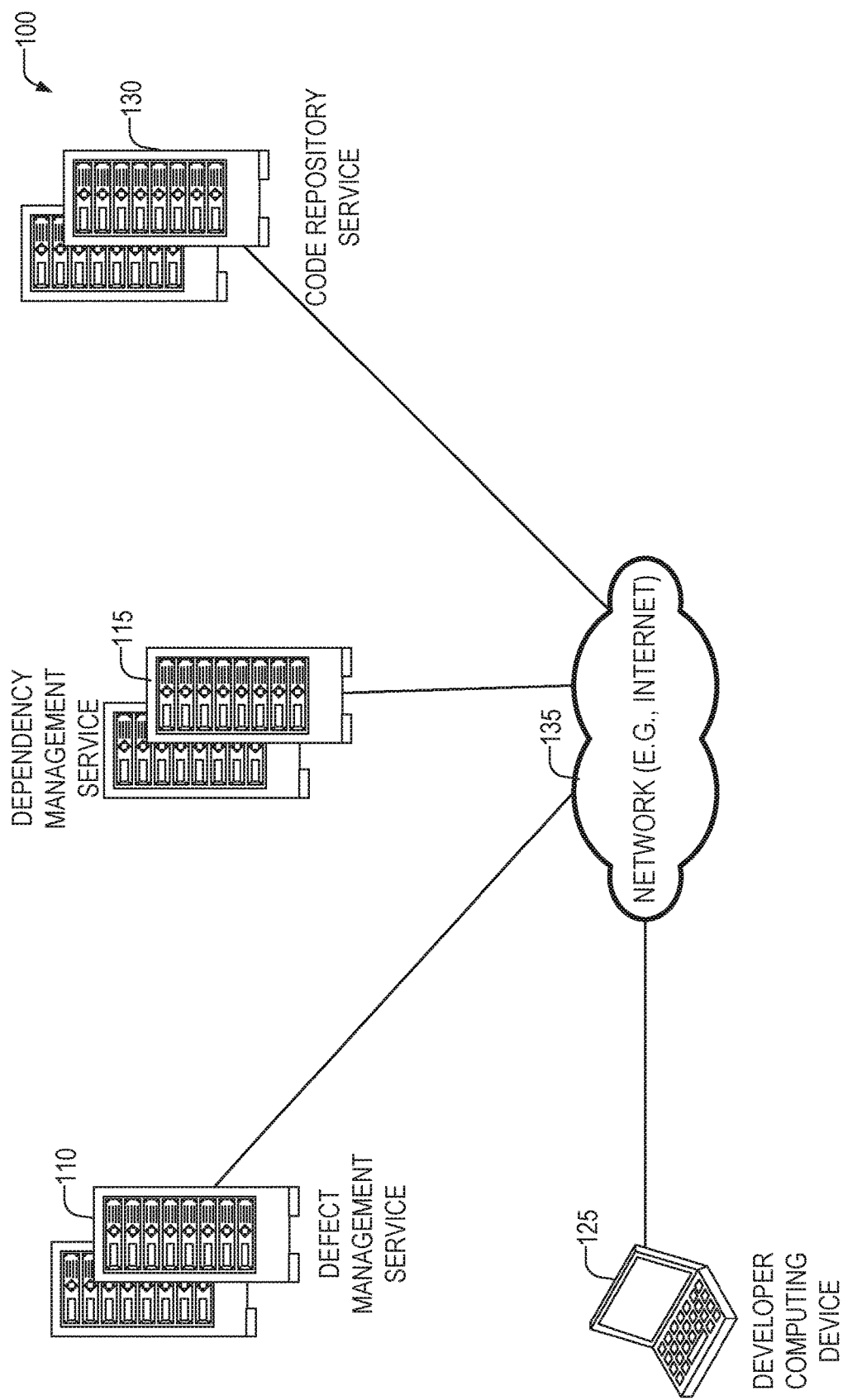
FIG. 1 illustrates a software dependency tracking environment of some examples of the present disclosure.

Given the proliferation of dependencies and different dependency versions, it may be difficult for software development engineers to properly determine what software components and hardware a given software component depends upon. While some dependencies may be determined based upon code compilation and linking scripts such as include lists, such tools may not identify all software component dependencies. For example, a first software component may depend on services provided by an independent second software component through an Application Programming Interface (API). The code of the second software component is not linked into the code of the first software component (either statically or dynamically), yet the second software component is a dependency of the first software component by virtue of the first software component's use of the API because changes in the second software component, and in particular, changes to the API, may impact functionality of the software component.

Even if the dependencies are all known, managing those dependencies may be even more difficult. For example, unbeknownst to a particular user, a dependency may have a new version. New versions often include defect fixes, vulnerability fixes, and other desirable features. However, these new versions also pose a risk. For example, the new version may introduce additional defects, may change the API, or the like. These incompatibilities may be difficult for application developers to sort through. For example, the defect may be between two incompatible dependencies. In an example, a dependency may be labelled end-of-life because it is no longer supported. The support status of various dependencies, especially second level or greater dependencies (e.g., dependencies of dependencies) may be very difficult to find and track. Nevertheless, the status of direct and indirect dependencies may create defects or impact performance of a software component.

Disclosed in some examples are methods, systems, devices, and machine-readable mediums for a dependency tracking service that automatically identifies and tracks information about dependencies of a software component and provides one or more visualizations displaying that information. The system may identify the dependencies through automated metadata analysis of the software component, behavior analysis of the software component, or source code analysis of the software component. The system may track status of the software component by reference to one or more code management systems, vulnerability reporting systems, or the like. Dependency status may be determined based upon one or more of whether a new version is released, whether a vulnerability exists, whether the dependency is end-of-life, or the like. In some examples, the system may additionally provide recommendations regarding the dependencies. For example, a recommendation to switch to a different dependency based upon a trend in other software components to switch to the dependency, a better performance, or the like. The status may be tracked periodically, via an event-driven architecture, for example. The system may then provide one or more GUIs that provide a visualization of the dependencies and their statuses, among other information.

As noted, the dependencies may be determined through automated metadata analysis of a software component, behavior analysis of the software component, or source code analysis of the software component. In some examples, the dependencies may be determined using one or more dependency identification components. One example dependency identification component may query corresponding data in support platforms, such as by querying configuration files provided by the software component developer, linked files, or the like. Another example dependency identification component may scan source code to identify dependencies, such as interprocess communication calls or other API calls. This may be accomplished by using regular expression or other rules. In other examples, this may be done using one or more machine learning models. Dependencies identified may be displayed to one or more end users. The one or more end users may confirm or deny the dependency. In an example, the machine learning model may be trained and updated using reinforcement learning to enhance its future performance. Another example dependency identification component may include using a scanner to determine API calls to other software components. The scanner may scan network traffic and/or interprocess communications.

Dependency identification components may scan the software component periodically or based upon a specified event. Specified events include a request from a user (e.g., on-demand), a change in the software component, a notification of a change in a dependency, or the like.

In some examples, an event driven architecture may be used to automatically track status changes in dependencies. For example, a software code repository, a project website, a developer website, or a vulnerability reporting service or the like may send a notification to the dependency tracking service when a dependency status changes. Example status changes include new versions, newly identified vulnerabilities, and the like. In other examples, other methods of identifying changes in dependency status may be utilized, such as using a request/response model, scraping or otherwise interfacing with a software code repository, project website, developer website, vulnerability reporting service, analysis of release notes of a most recent version, and the like. For vulnerabilities, a vulnerability reporting service may notify the dependency tracking system of vulnerabilities. In these examples the dependency tracking system may subscribe to the dependency tracking system for a dependency and may be notified when a vulnerability is identified in that dependency. In other examples, the dependency tracking system may periodically poll the vulnerability system.

The dependency tracking system may create one or more health indicators for each dependency based upon the dependency status information. For example, a health indicator may be binary—that is the dependency is healthy or not, tri-nary (e.g., not healthy, healthy, or of intermediate health), or the like. In these examples, the health indicator may be determined based upon one or more specified rules. For example, a healthy indicator may be assigned to a dependency when the dependency version used by the software component is up-to-date with no known vulnerabilities. An unhealthy or intermediate indicator may be assigned when one or both of the dependency of the software component is not up-to-date, or has vulnerabilities. In some examples, multiple health indicators may be combined to produce an overall dependency health indicator for the software component. By rolling up the health of dependencies, one-by-one, the health of the software component's dependencies may be assessed and displayed.

The dependency tracking system may provide various advanced visualizations in one or more GUIs. For example, a visualization of current dependencies of a particular software component, visualization of past dependencies, visualization of dependency histories, a visualization of the number of dependencies (and historical numbers of dependencies), a health of dependencies, and the like. The GUI may provide a dependency tree that shows not only direct dependencies but indirect dependencies. In some examples, the users may view a history of their software component, but also histories of the dependencies themselves, including which other software components depend on that component, and the like. Dependency health information may also be displayed. Further, the GUI may display dependency management information, such as the contact information for the dependency. The GUI may be displayed as a dashboard that may be updated or modified by users. Visualizations may change based upon a role of the user in an organization. For example, a coder or project manager may see the individual dependency statuses and an executive may see the health and dependency statuses of each of an organization's software components.

Other example functionality of the dependency tracking and visualization system includes alerting to dependency mismatches. For example, software components may be assigned various tiers based upon importance. For example, tier 1 may be most important, and tier 5 may be least important. In some examples, the system may determine that a dependency assigned an importance of tier 5 may be a dependency of a tier 1 component. In these examples, a user may be alerted to this issue. In other examples, the dependency may be automatically updated from a tier 5 to a tier 1 to reflect the importance of this dependency to a more important software component. In some examples, the system may provide a dependency score that determines how dependent one software component is to another. For example, based upon how many much the dependency is called by the software component, and the like.

The present disclosure thus solves a technical problem of dependency management using a technical solution of automatic dependency tracking. The present disclosure reduces software defects by providing automated and timely information on dependency issues. This reduces processor load, memory usage, and power usage of computing systems by avoiding time consuming debugging operations.

FIG. 1 illustrates a software dependency tracking environment 100 of some examples of the present disclosure. Developer computing device 125 and one or more computing services may communicate over a network 135. Network 135 may be a local network, such as a Local Area Network (LAN), a network that spans a wider area such as a Wide Area Network (WAN), the Internet, an Intranet, or the like. Code repository service 130 may be a service that implements software source code control, such as storage and backup of software code; version management; access management; software defect management; software component code building services; and the like. A software component may be directly executable instructions, interpretable instructions (e.g., a Java object), a script file, HyperText Markup Language (HTML) file, or the like. A software component may be an entire software application, a plug-in, or the like and may be directly executable or may be only executable as part of a larger application. In some examples, rather than a code repository service 130, a system may utilize one or more application stores that store downloadable executable applications. Example application stores include the Apple Appstore®, Microsoft Store®, Android Play® store, and the like.

As noted, the software components may have one or more dependencies. For example, software frameworks that become part of the software component when compiled (e.g., by the code repository service), different Application Programming Interfaces (APIs), other software components that the software component communicates with or utilizes, and the like. Dependency management service 115 may identify and track dependencies to one or more software components. For example, by analyzing source code, execution behavior, or by being provided the information by a user of the developer computing device 125. For example, the dependency management service 115 may develop one or more dependency trees for one or more software components. The dependency trees may map software dependencies for each software component. The root node of the dependency tree may be the software component (which may be a dependency for a different software component). Nodes branching from the root node may be first degree dependencies. Nodes branching from the first-degree dependencies may be second-degree dependencies, and so on with the dependency degree of a particular dependency being a number of branches from the software component to the dependency.

Dependency management service 115 may track one or more versions of one or more software dependencies used by the component. For example, by interfacing with one or more code repository services, such as code repository service 130, the system may determine when a new version of an object is released or predicted to be released and may notify administrators of other software components that depend on the software component with the new version. One or more changelogs or code differences that identify the changes made may also be identified and communicated to the administrators. Dependency management service 115 may provide one or more GUIs providing information on the dependencies.

In addition, dependency management service 115 may interface with a vulnerability reporting component to determine one or more vulnerabilities that are reported for one or more of the dependencies tracked by the dependency management service 115. Defect management service 110 may be a service where developers, such as developer computing device 125 report and manage defects in their software components or may be a database where vulnerabilities are reported and/or stored, such as a Common Vulnerabilities and Exposures system.

In some examples, in addition to showing dependency versions and status, the interfaces may provide information about dependency usage information such as how much a particular dependency is utilized in a component or across all (or a subset of all) components it tracks; trends showing which dependencies (e.g., globally across all software components managed by the dependency management service 115) are used most and whether that usage is increasing or decreasing, and the like.

Figure 6:
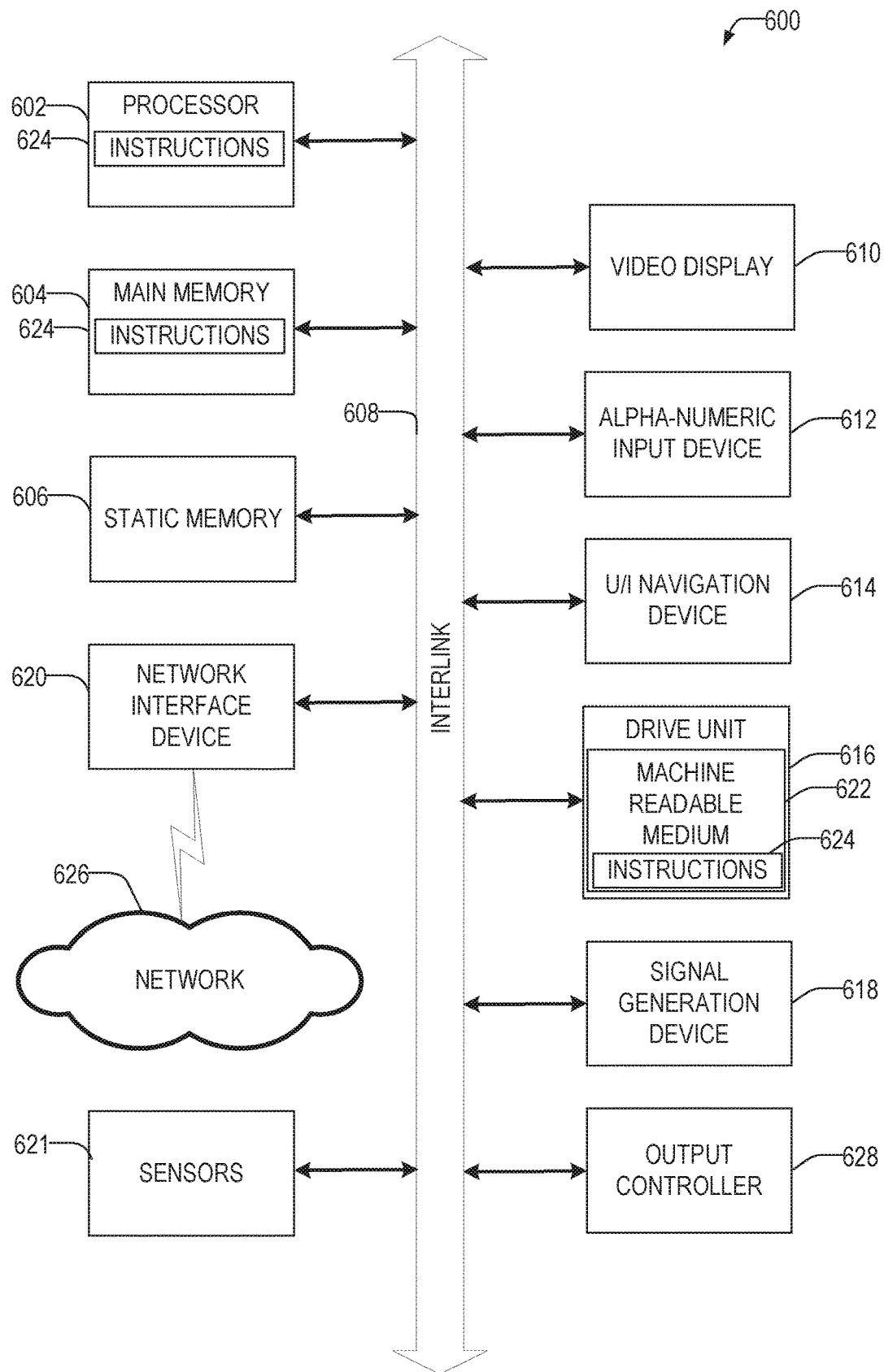
FIG. 6 is a block diagram illustrating an example of a machine upon which one or more embodiments may be implemented.

The services and devices of FIG. 1, such as the developer computing device 125, dependency management service 115, defect management service 110, and code repository service 130 are exemplary and one of ordinary skill in the art with the benefit of applicant's disclosure will appreciate that the functions performed by one of the components may be performed by a different component. Additionally, one of ordinary skill in the art with the benefit of applicant's disclosure will appreciate that one or more components may be combined, removed, split into multiple components, or the like. Services, as used herein, may be network-based services that are provided by one or more computing devices, such as shown in FIG. 6.

Figure 2:
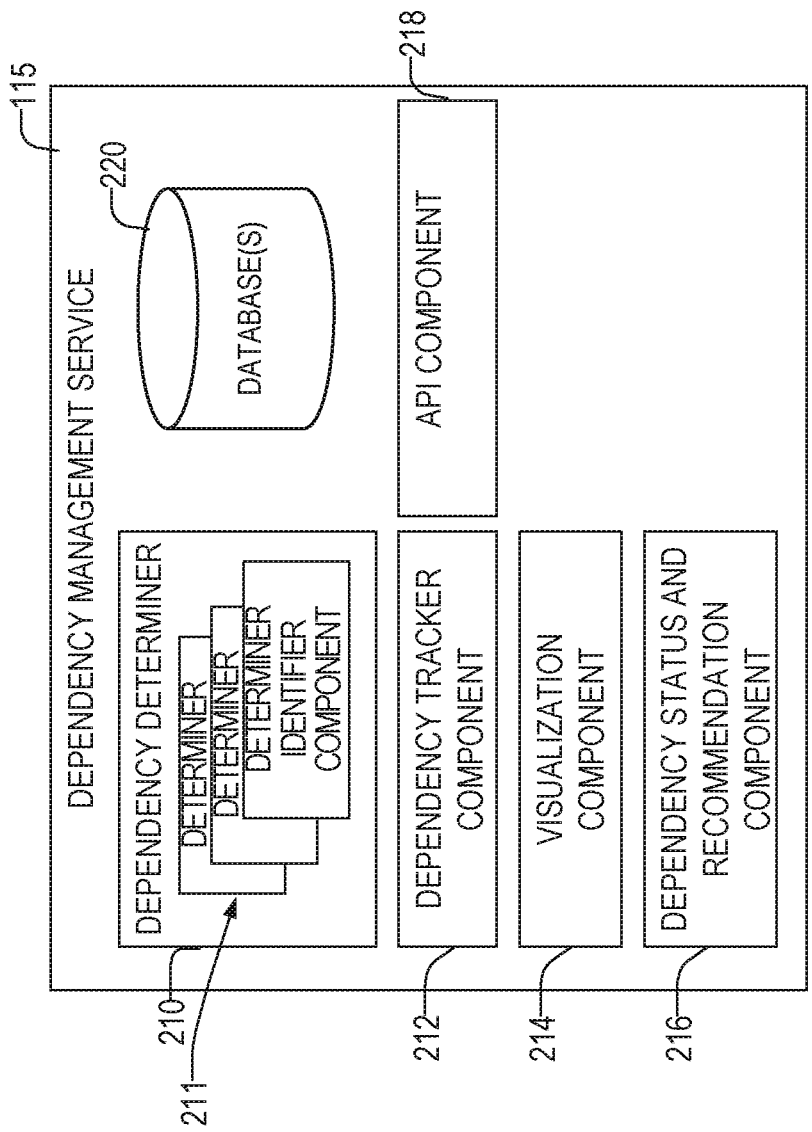
FIG. 2 illustrates a dependency management service according to some examples of the present disclosure.

FIG. 2 illustrates a dependency management service 115 according to some examples of the present disclosure. Dependency management service 115 may include a dependency determiner component 210. Dependency determiner component 210 may have one or more determiner identifier components 211. Determiner identifier components 211 may each utilize one or more methods for determining dependencies of a software component. For example, one determiner identifier component may analyze metadata of the source code including looking at include files, .dll libraries, and a metadata file with listed dependencies determined by developers. Another determiner identifier component may analyze the code looking for function or API calls. This determiner identifier may utilize string matching rules that are based upon prespecified lists of API language. In some examples, the determiner identifier component may then utilize these rules to determine a web address where the API call is to be sent and cross-reference that web address with one or more specified lists of software components to identify a dependency. The API version may be determined using a latest version, or may be determined using one or more fields within the message sent to, or received by, the application.

Still yet another determiner identifier component may analyze the software component during execution. For example, by creating an execution environment and executing it. In still other examples, this determiner identifier component may be linked (e.g., temporarily) into the code of the software component and may monitor the interprocess and network traffic to determine other software components (which may be on other machines) that the software component is contacting. The determiner identifier component may determine the software component dependency by comparing the destination process information or network address with a specified list of dependencies that includes their process information and/or network addresses. The API version may be determined using a latest version, a version currently executing on the computing system (e.g., as determined by the name of the executable, a readme file in a directory of the application on a storage device, comparing a hash of the executable with a specified list of hash values for various versions of the dependency, or the like) or may be determined using one or more fields within the message sent to, or received by, the application over the network.

Still yet another determiner identifier component may analyze the software code using machine-learning models. For example, by training a neural network on a training data set that includes source code and manually labeled dependencies. In other examples, a large language model (LLM), such as ChatGPT may be utilized and may be fed the source code for analysis. The LLM model may be instructed to find all interprocess communication calls or network calls and what the target of those calls is. Determiner identifier components may be separate threads, processes, procedures, functions, plugins, modules, or the like.

Another determiner identifier component may decompile code. For example, if source code of software component is not available, the determiner identifier component may decompile it and analyze it using the code analysis determiners.

Dependency management service may also include a dependency tracker component 212. Dependency tracker component 212 may register for updates to each of the dependencies identified by the determiner identifier component with a code repository service (such as code repository service 130) or other service. In addition, the dependency tracker component 212 may determine whether any vulnerabilities exist to one or more of the versions of the dependency. For example, by registering for vulnerability or defect notices from a defect management system (such as defect management system 110). In some examples, rather than receive push notifications from the defect management service and/or the code repository service, the dependency tracker component 212 may periodically poll these services.

Visualization component 214 may provide one or more GUIs that provide information about dependencies. GUIs may be provided in a variety of ways. GUI descriptors may be one or more data structures or files that, when interpreted by an application, instruct the application to render a GUI. Example GUI descriptors include Hypertext Markup Language (HTML) files, extensible Markup Language (XML) files, script files, JavaScript files, Java files, Cascading Style Sheets (CSS), information for display in a specified GUI, and the like. Applications may include a browser or a dedicated application. The dedicated application may have portions of the GUI already specified in the instructions of the application that may be supplemented by information in the GUI descriptors.

Dependency status and recommendation component 216 may calculate one or more status indicators for one or more of the dependencies identified by the dependency determiner component 210 based upon the status information retrieved by the dependency tracker component 212. For example, based upon whether a new version of the dependency exists, whether a vulnerability has been reported for the version used by the software component, or the like. Status may be a binary status where one binary value means that the dependency is good and another value means the dependency is bad. Good may be indicated, for example, when the dependency is one or more of: up-to-date, has no known vulnerabilities, or the like. Bad may be indicated, for example, when the dependency is not one or more of: up-to-date, has no known vulnerabilities, or the like. Status indicators may be a score, based upon a specified formula that considers the above factors. In some examples, the status may include a testing status of a current version of the dependency. For example, if the software component was tested with the current version. In examples in which the status indicators are a score, points may be assigned based upon whether the dependency is up-to-date, has no known vulnerabilities, or the like. In some examples, for the version points, different points may be added (or subtracted) from the score based upon how close the utilized and/or tested version is to the current version. For example, if the software component has incorporated and/or tested version 1.6 of a dependency, but a version 2.1 is the latest version, fewer points may be given to the software component than if it had incorporated and/or tested version 1.9 of the dependency. In some examples, the status indicator may be converted to a percentage of the total points possible.

Status indicators of all the dependencies of a given software component may be aggregated to form a score for the entire software component. Each individual status of each component may be weighted and combined to form a total score. In some examples, dependencies may be weighted differently based upon an importance of the dependency. The importance of the dependency may be based upon a degree of the dependency (e.g., a dependency of a dependency (2nd degree dependency) may be weighted lesser than a direct, 15 degree dependency), an importance level input by a user, a usage level of the dependency (e.g., how often the dependency is utilized by the software component as identified by automatically by the code or network scanning determiner identifier component), or the like.

API component 218 may interface with one or more external systems, such as a code repository, defect tracking tools, user devices, and the like. For example, by implementing one or more network protocols, APIs, and the like. Database 220 may store dependency information, status information, and the like.

In some examples, the dependency status and recommendation component 216 may provide one or more recommendations for managing the dependencies. For example, by suggesting better dependencies. Trends in dependency usages across a plurality of software components managed by the dependency management service may be analyzed to find patterns where a number of software components utilizing a first dependency declines, and a number of software components utilizing a second dependency rises. In these examples, the system may recommend moving from the first to the second dependency. In some examples, in addition to simply matching the increase in usage of the first dependency to the decrease in usage of the second dependency, the function of the dependency may be determined (e.g., using manual input, or via machine-learning) and a second dependency may be recommended only if it is a similar function to the first dependency. In other examples, the second dependency may be recommended if it performs a same function and it has fewer known vulnerabilities, as determined by a defect management service 110.

In some examples, the system may automatically test replacement dependencies. For example, by scanning the software component code and replacing calls to a first dependency with calls to a second dependency, e.g., by using an AI such as a large language model. The system may automatically run one or more tests of the modified software component to determine whether it works properly (e.g., whether it has additional defects over known defects with the first dependency), and whether the performance is better, worse, or unchanged. The system may report the results to the user.

In some examples, dependencies identified by the dependency management service 115 may be used to automatically modify one or more firewalls of an organization. For example, the dependencies may be linked with one or more firewall records that specify one or more settings to allow the dependencies to send information through the firewall. Upon detecting the dependency, the system may automatically submit the information for approval to the firewall. In some examples, the approvals may be periodically updated. That is, when a dependency is no longer needed, the system may close the hole in the firewall for that dependency.

Figure 3:
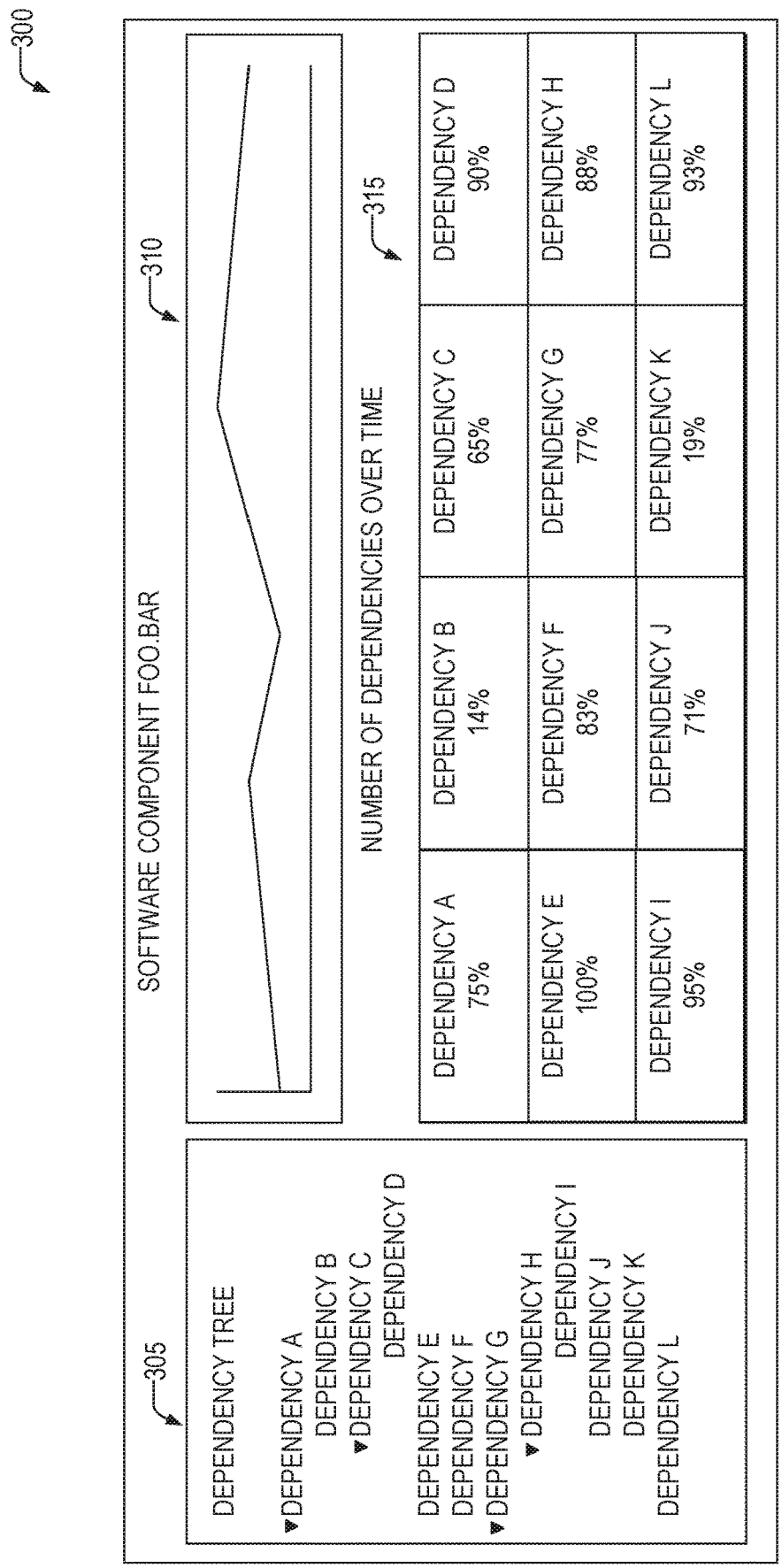
FIG. 3 illustrates a graphical user interface dashboard of a dependency management service according to some examples of the present disclosure.

FIG. 3 illustrates a dashboard 300 of a dependency management service 115 according to some examples of the present disclosure. Dashboard 300 may be a Graphical User Interface. A dashboard 300 may include a dependency tree 305. The dependency tree may be a tree structure where first level dependencies are listed on a far left (dependency A, E, F, G, and L) and each successive level is indented further to the right. For example, second level dependencies B, C, depend from dependency A, and third level dependency D depends from dependency C; second level dependencies H, J, and K, and third level dependency I depends from H. Each level may be expanded or collapsed to provide for an uncluttered and customizable view.

A trend graph 310 shows a number of dependencies of the software component over time. A dependency status table 315 shows each dependency and a status score in the form of a percentage. Each dependency may be selectable and when selected the information about the dependency (current version; newest available version; vulnerabilities; and the like) may be displayed. In some examples, each dependency may have its box colored based upon the score. For example, a red box means a low score, a vulnerability, an updated version is available or the like; a green box may mean that the software component is using the current version, the dependency does not have a current vulnerability, or the like.

As disclosed, vulnerabilities of a dependency may factor into the status score, color of the dependency as displayed in a dashboard, and the like. In some examples, the severity of the vulnerability may also factor into the score, color of the dependency, and the like. A high severity vulnerability may color the dependency red in the dashboard, whereas a medium severity may cause a yellow color, and a low severity may allow the box to stay green.

In addition to showing dependencies of the software component, the system may show which other software components a particular software component is a dependency of. In some examples, the system may calculate a dependency complexity resource utilization score. This score predicts server workload based upon the software component's dependencies and what other software components depend on that software component. For example, if a second software component depends on a first software component and is set to go live, the system may recommend increasing an amount of hardware resources dedicated to the software component.

In addition to the information shown in FIG. 3, a status score of an entire software component may be created. For example, based upon the status score of the individual dependencies, a status score of the entire component may be created. For example, by weighted combination of each of the scores of each dependency. In some examples, a user interface showing scores of a plurality of software components may be provided to a manager or other user.

Figure 4:
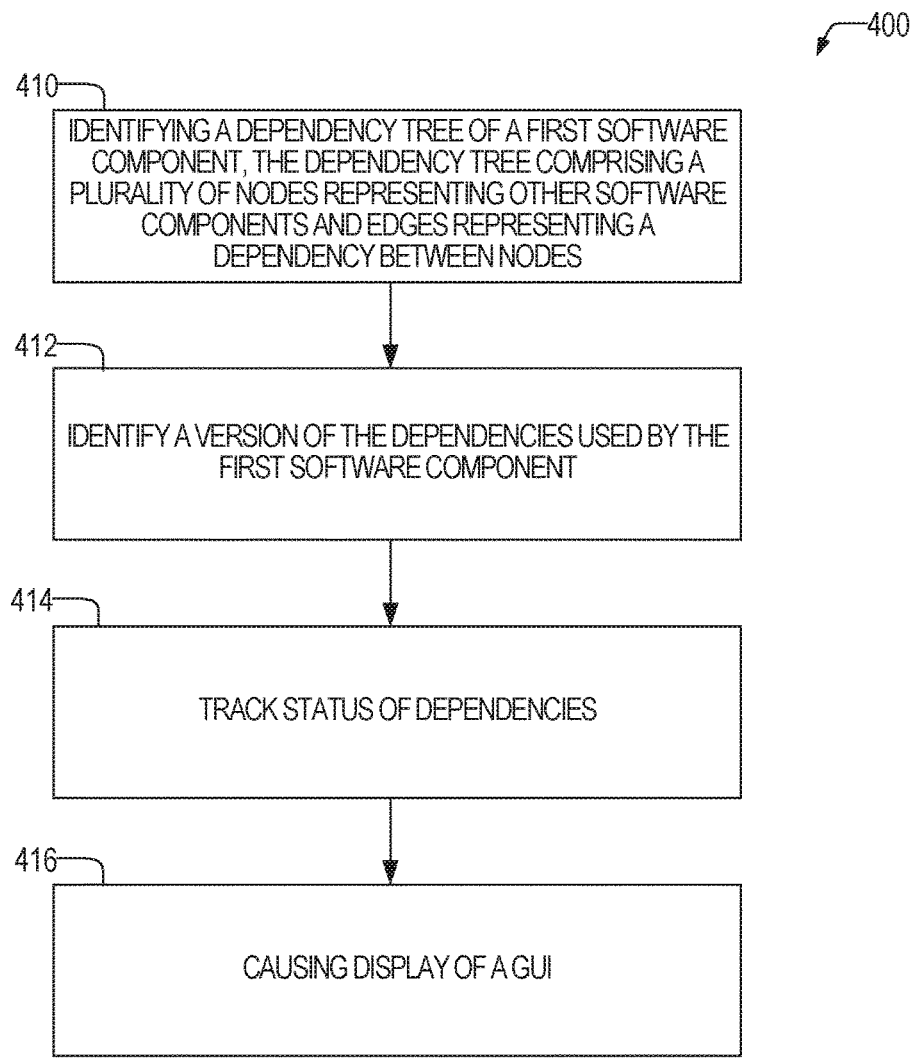
FIG. 4 illustrates a flowchart of a method of providing a dependency management service according to some examples of the present disclosure.

FIG. 4 illustrates a flowchart of a method 400 of providing a dependency management service according to some examples of the present disclosure. At operation 410, the system may identify a dependency tree of a first software component, the dependency tree comprising a plurality of nodes representing other software components and edges representing a dependency between nodes. The identification of dependencies may be based upon code analysis, execution analysis, metadata analysis, manual input, and the like.

At operation 412, the system may identify versions of the dependencies used and/or tested by the first software component. For example, based upon the identification in operation 410.

At operation 414, the system may track the status of the dependencies. For example, by contacting one or more external services to obtain status of new versions, vulnerabilities, and/or the like. In some examples, one or more status indicators are created.

At operation 416, the system may cause a GUI to be displayed—e.g., on a display device of a user. The GUI may be displayed, for example, by creating one or more GUI descriptors and sending them to a client computing device of the user. The GUI may include the elements of FIG. 3 and/or other status indicators.

Figure 5:
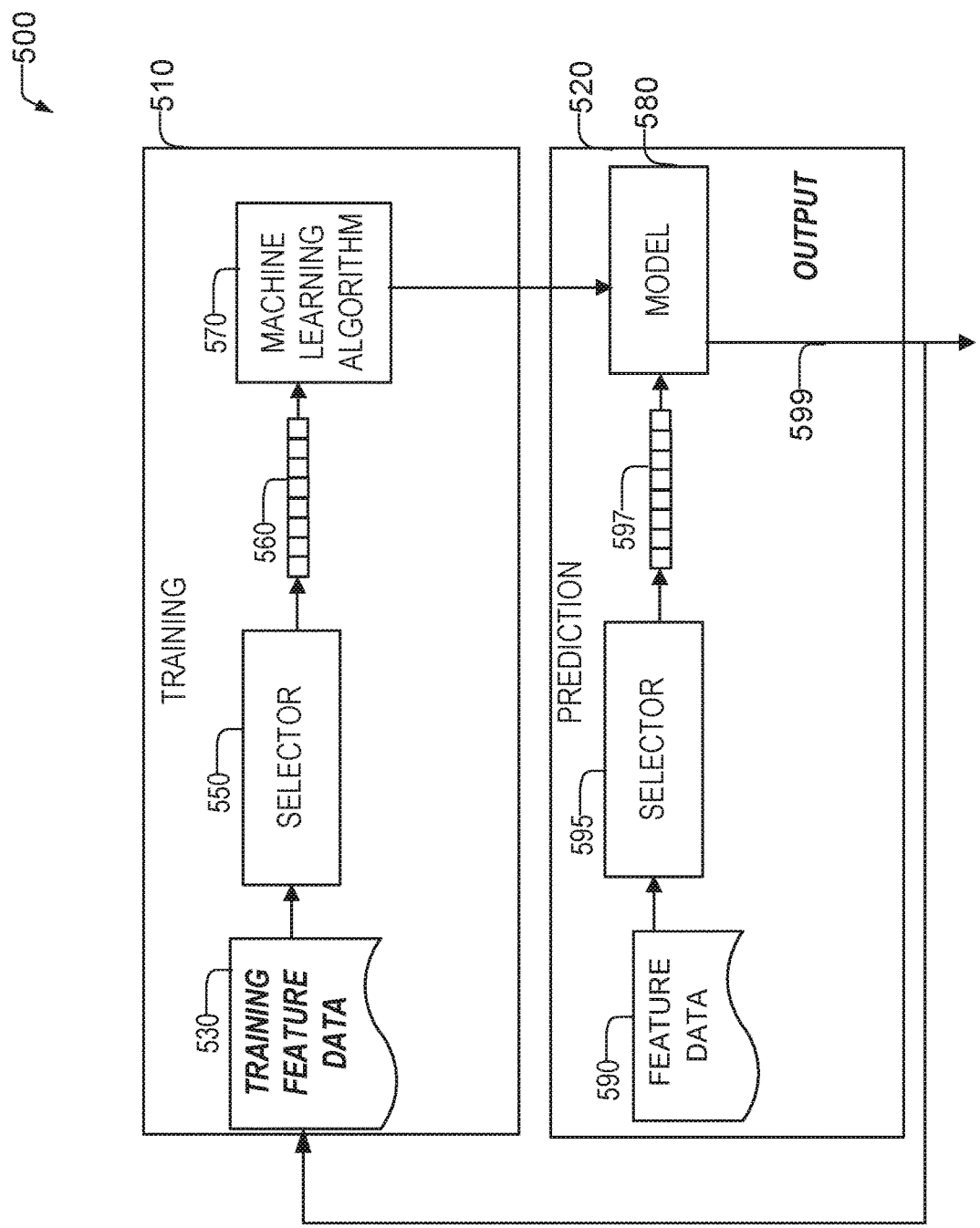
FIG. 5 shows an example machine learning module according to some examples of the present disclosure.

FIG. 5 shows an example machine learning module 500 according to some examples of the present disclosure. The machine learning module 500 may be implemented in whole or in part by one or more computing devices. In some examples, the training module 510 may be implemented by a different device than the prediction module 520. In these examples, the model 580 may be created on a first machine and then sent to a second machine. In some examples, one or more portions of the machine learning module 500 may be implemented by one or more components from FIG. 2.

In some examples, machine learning module 500 utilizes a training module 510 and a prediction module 520. Training module 510 inputs training feature data 530 into selector module 550. The training feature data 530 may include one or more sets of training data. The training feature data 530 may be labeled with the desired output. In other examples, the training data may not be labeled, and the model may be trained using unsupervised methods and/or feedback data—such as through a reinforcement learning method. The feedback data may be a measure of error between a desired result of the algorithm and the actual result.

Selector module 550 converts and/or selects training vector 560 from the training feature data 530. For example, the selector module 550 may filter, select, transform, process, or otherwise convert the training data. For example, the selector module 550 may apply one or more feature selection algorithms to find features in the training data. The selected data may fill training vector 560 and comprises a set of the training data that is determined to be predictive of a result. Information chosen for inclusion in the training vector 560 may be all the training feature data 530 or in some examples, may be a subset of all the training feature data 530. Selector module 550 may also convert or otherwise process the training feature data 530 such as normalization, encoding, and the like. The training vector 560 may be utilized (along with any applicable labels) by the machine learning algorithm 570 to produce a model 580. In some examples, other data structures other than vectors may be used. The machine learning algorithm 570 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction module 520, feature data 590 is input to the selector module 595. Selector module 595 may operate the same, or differently than selector module 550. In some examples, selector modules 550 and 595 are the same modules or different instances of the same module. Selector module 595 produces vector 597, which is input into the model 580 to produce an output 599. For example, the weightings and/or network structure learned by the training module 510 may be executed on the vector 597 by applying vector 597 to a first layer of the model 580 to produce inputs to a second layer of the model 580, and so on until the encoding is output. As previously noted, other data structures may be used other than a vector (e.g., a matrix).

The training module 510 may operate in an offline manner to train the model 580. The prediction module 520, however, may be designed to operate in an online manner. It should be noted that the model 580 may be periodically updated via additional training and/or user feedback. For example, additional training feature data 530 may be collected as users provide feedback on the performance of the predictions.

The machine learning algorithm 570 may be selected from among many different potential supervised or unsupervised machine learning algorithms. Examples of learning algorithms include artificial neural networks, Generative Pretrained Transformer (GPT), convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

As noted, the machine-learning model may be used to determine dependencies. The training feature data 530 may include software code and/or data about the execution of a plurality of training software components. The data may, in some examples, be labelled with the dependencies. In other examples, unsupervised models may be utilized that do not require labelling. In these examples, the feature data 590 may be a software component and the output 599 may be a list of dependencies.

In some examples, the machine-learning model may be used to scan the software component code to determine new frameworks or software components as dependencies (e.g., as a replacement for other dependencies). For example, the AI may replace a first dependency with a second dependency in the software component and may automatically test the software component to determine whether it works properly (e.g., whether it has additional defects over known defects with the first dependency), and whether the performance is better, worse, or unchanged. The system may report the results to the user. In these examples, the model may be a large language model (LLM) that may search for specific API calls of the first dependency and replace them with corresponding API calls of a second dependency. In these examples the input prompts may include the API definitions for one or more of the dependencies.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a desktop, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like. Machine 600 may implement one or more of the services and devices of FIG. 1, be configured to implement the components of FIG. 2, the GUI of FIG. 3, the method of FIG. 4, and the machine-learning components of FIG. 5.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

Example 1 is a method for tracking software component dependencies, the method comprising: identifying a dependency tree of a first software component, the dependency tree comprising a plurality of nodes representing other software components and edges representing dependencies between nodes; identifying versions of dependencies in the dependency tree currently used by the first software component; tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component; and causing display of a graphical user interface (GUI) including the dependency tree, the versions of dependencies, and the status of each particular dependency of the dependencies in the dependency chain.

In Example 2, the subject matter of Example 1 includes, wherein identifying the dependency tree comprises monitoring a network behavior of the first software component and identifying a network message between a first dependency of the dependency tree and the first software component.

In Example 3, the subject matter of Example 2 includes, identifying a second-level dependency of the first software component based upon identifying a dependency of the first dependency; and adding the second-level dependency to the dependency tree as a node with an edge connecting the first dependency and second-level dependency.

In Example 4, the subject matter of Examples 1-3 includes, identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

In Example 5, the subject matter of Examples 1~4 includes, identifying a trend that a number of software components utilizing a first dependency of the dependency tree is decreasing over a specified amount of time; responsive to identifying that a number of software components utilizing a first dependency of the dependency tree is trending downward, identifying a replacement second dependency that is not currently a dependency of the software component; and providing the trend and the replacement second dependency to a user.

In Example 6, the subject matter of Example 5 includes, wherein identifying the replacement second dependency that is not currently the dependency of the first software component comprises identifying that a second software component that no longer has the first dependency as a dependency now has the replacement second dependency.

In Example 7, the subject matter of Examples 1-6 includes, calculating a dependency score indicating a measure of how dependent on a first dependency in the dependency chain the first software component is, the dependency score calculated based upon a number and frequency of application programming interface (API) calls to the first dependency the first software component uses.

Example 8 is a computing device for tracking software component dependencies, the computing device comprising: a processor; a memory, the memory storing instructions, which when executed, cause the processor to perform operations comprising: identifying a dependency tree of a first software component, the dependency tree comprising a plurality of nodes representing other software components and edges representing dependencies between nodes; identifying versions of dependencies in the dependency tree currently used by the first software component; tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component; and causing display of a graphical user interface (GUI) including the dependency tree, the versions of dependencies, and the status of each particular dependency of the dependencies in the dependency chain.

In Example 9, the subject matter of Example 8 includes, wherein the operations of identifying the dependency tree comprises monitoring a network behavior of the first software component and identifying a network message between a first dependency of the dependency tree and the first software component.

In Example 10, the subject matter of Example 9 includes, wherein the operations further comprise: identifying a second-level dependency of the first software component based upon identifying a dependency of the first dependency; and adding the second-level dependency to the dependency tree as a node with an edge connecting the first dependency and second-level dependency.

In Example 11, the subject matter of Examples 8-10 includes, wherein the operations further comprise: identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

In Example 12, the subject matter of Examples 8-11 includes, wherein the operations further comprise: identifying a trend that a number of software components utilizing a first dependency of the dependency tree is decreasing over a specified amount of time; responsive to identifying that a number of software components utilizing a first dependency of the dependency tree is trending downward, identifying a replacement second dependency that is not currently a dependency of the software component; and providing the trend and the replacement second dependency to a user.

In Example 13, the subject matter of Example 12 includes, wherein the operations of identifying the replacement second dependency that is not currently the dependency of the first software component comprises identifying that a second software component that no longer has the first dependency as a dependency now has the replacement second dependency.

In Example 14, the subject matter of Examples 8-13 includes, wherein the operations further comprise calculating a dependency score indicating a measure of how dependent on a first dependency in the dependency chain the first software component is, the dependency score calculated based upon a number and frequency of application programming interface (API) calls to the first dependency the first software component uses.

Example 15 is a non-transitory machine-readable medium, storing instructions for tracking software component dependencies, the instructions, when executed by a computing device, cause the computing device to perform operations comprising: identifying a dependency tree of a first software component, the dependency tree comprising a plurality of nodes representing other software components and edges representing dependencies between nodes; identifying versions of dependencies in the dependency tree currently used by the first software component; tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component; and causing display of a graphical user interface (GUI) including the dependency tree, the versions of dependencies, and the status of each particular dependency of the dependencies in the dependency chain.

In Example 16, the subject matter of Example 15 includes, wherein the operations of identifying the dependency tree comprises monitoring a network behavior of the first software component and identifying a network message between a first dependency of the dependency tree and the first software component.

In Example 17, the subject matter of Example 16 includes, wherein the operations further comprise: identifying a second-level dependency of the first software component based upon identifying a dependency of the first dependency; and adding the second-level dependency to the dependency tree as a node with an edge connecting the first dependency and second-level dependency.

In Example 18, the subject matter of Examples 15-17 includes, wherein the operations further comprise: identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

In Example 19, the subject matter of Examples 15-18 includes, wherein the operations further comprise: identifying a trend that a number of software components utilizing a first dependency of the dependency tree is decreasing over a specified amount of time; responsive to identifying that a number of software components utilizing a first dependency of the dependency tree is trending downward, identifying a replacement second dependency that is not currently a dependency of the software component; and providing the trend and the replacement second dependency to a user.

In Example 20, the subject matter of Example 19 includes, wherein the operations of identifying the replacement second dependency that is not currently the dependency of the first software component comprises identifying that a second software component that no longer has the first dependency as a dependency now has the replacement second dependency.

In Example 21, the subject matter of Examples 15-20 includes, wherein the operations further comprise calculating a dependency score indicating a measure of how dependent on a first dependency in the dependency chain the first software component is, the dependency score calculated based upon a number and frequency of application programming interface (API) calls to the first dependency the first software component uses.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for tracking software component dependencies, the method comprising:
   identifying a dependency tree of a first software component, the dependency tree comprising a plurality of nodes representing other software components and edges representing dependencies between nodes;
   identifying versions of dependencies in the dependency tree currently used by the first software component;
   tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component;

causing display of a graphical user interface (GUI) including the dependency tree, the versions of dependencies, and the status of each particular dependency;

identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

2. The method of claim 1, wherein identifying the dependency tree comprises monitoring a network behavior of the first software component and identifying a network message between a first dependency of the dependency tree and the first software component.

3. The method of claim 2, further comprising, identifying a second-level dependency of the first software component based upon identifying a dependency of the first dependency; and adding the second-level dependency to the dependency tree as a node with an edge connecting the first dependency and second-level dependency.

4. The method of claim 1, further comprising:

identifying a trend that a number of software components utilizing a first dependency of the dependency tree is decreasing over a specified amount of time;

responsive to identifying that a number of software components utilizing a first dependency of the dependency tree is trending downward, identifying a replacement second dependency that is not currently a dependency of the software component; and providing the trend and the replacement second dependency to a user.

5. The method of claim 4, wherein identifying the replacement second dependency that is not currently the dependency of the first software component comprises identifying that a second software component that no longer has the first dependency as a dependency now has the replacement second dependency.

6. The method of claim 1, further comprising calculating a dependency score indicating a measure of how dependent on a first dependency the first software component is, the dependency score calculated based upon a number and frequency of application programming interface (API) calls to the first dependency the first software component uses.

7. A computing device for tracking software component dependencies, the computing device comprising:

a processor;

a memory, the memory storing instructions, which when executed, cause the processor to perform operations comprising:

identifying a dependency tree of a first software component, the dependency tree comprising a plurality of nodes representing other software components and edges representing dependencies between nodes;

identifying versions of dependencies in the dependency tree currently used by the first software component;

tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component;

causing display of a graphical user interface (GUI) including the dependency tree, the versions of dependencies, and the status of each particular dependency;

identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

8. The computing device of claim 7, wherein the operations of identifying the dependency tree comprises monitoring a network behavior of the first software component and identifying a network message between a first dependency of the dependency tree and the first software component.

9. The computing device of claim 8, wherein the operations further comprise:

identifying a second-level dependency of the first software component based upon identifying a dependency of the first dependency; and adding the second-level dependency to the dependency tree as a node with an edge connecting the first dependency and second-level dependency.

10. The computing device of claim 7, wherein the operations further comprise:

identifying a trend that a number of software components utilizing a first dependency of the dependency tree is decreasing over a specified amount of time;

responsive to identifying that a number of software components utilizing a first dependency of the dependency tree is trending downward, identifying a replacement second dependency that is not currently a dependency of the software component; and providing the trend and the replacement second dependency to a user.

11. The computing device of claim 10, wherein the operations of identifying the replacement second dependency that is not currently the dependency of the first software component comprises identifying that a second software component that no longer has the first dependency as a dependency now has the replacement second dependency.

12. The computing device of claim 7, wherein the operations further comprise calculating a dependency score indicating a measure of how dependent on a first dependency the first software component is, the dependency score calculated based upon a number and frequency of application programming interface (API) calls to the first dependency the first software component uses.

13. A non-transitory machine-readable medium, storing instructions for tracking software component dependencies, the instructions, when executed by a computing device, cause the computing device to perform operations comprising:

identifying a dependency tree of a first software component, the dependency tree comprising a plurality of nodes representing other software components and edges representing dependencies between nodes;

identifying versions of dependencies in the dependency tree currently used by the first software component;

tracking a status of each particular dependency of the dependencies in the dependency tree based upon communications with an external computing service, the status determined based upon one or more of whether there is an availability of an updated version of the particular dependency or a presence of a vulnerability of a version of the particular dependency used by the first software component;

causing display of a graphical user interface (GUI) including the dependency tree, the versions of dependencies, and the status of each particular dependency;

identifying that a first dependency of the dependency tree is assigned a component importance level that is a lower level than a level assigned to the first software component; and responsive to identifying that the first dependency of the dependency tree is assigned the component importance level that is a lower level than the level assigned to the first software component, notifying a user.

14. The non-transitory machine-readable medium of claim 13, wherein the operations of identifying the dependency tree comprises monitoring a network behavior of the first software component and identifying a network message between a first dependency of the dependency tree and the first software component.

15. The non-transitory machine-readable medium of claim 14, wherein the operations further comprise:

identifying a second-level dependency of the first software component based upon identifying a dependency of the first dependency; and adding the second-level dependency to the dependency tree as a node with an edge connecting the first dependency and second-level dependency.

16. The non-transitory machine-readable medium of claim 13, wherein the operations further comprise:

identifying a trend that a number of software components utilizing a first dependency of the dependency tree is decreasing over a specified amount of time;

responsive to identifying that a number of software components utilizing a first dependency of the dependency tree is trending downward, identifying a replacement second dependency that is not currently a dependency of the software component; and providing the trend and the replacement second dependency to a user.

17. The non-transitory machine-readable medium of claim 16, wherein the operations of identifying the replacement second dependency that is not currently the dependency of the first software component comprises identifying that a second software component that no longer has the first dependency as a dependency now has the replacement second dependency.

* * * * *